United States Patent
Kato

(10) Patent No.: US 9,557,193 B2
(45) Date of Patent: Jan. 31, 2017

(54) OPTICAL ENCODER

(71) Applicant: Mitutoyo Corporation, Kawasaki, Kanagawa (JP)

(72) Inventor: Yoshiaki Kato, Kanagawa (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 103 days.

(21) Appl. No.: 14/575,027

(22) Filed: Dec. 18, 2014

(65) Prior Publication Data

US 2015/0177027 A1    Jun. 25, 2015

(30) Foreign Application Priority Data

Dec. 25, 2013  (JP) ................. 2013-266515

(51) Int. Cl.
*G01D 5/34* (2006.01)
*G01D 5/347* (2006.01)

(52) U.S. Cl.
CPC ...... *G01D 5/34707* (2013.01); *G01D 5/34715* (2013.01); *G01D 5/34746* (2013.01)

(58) Field of Classification Search
CPC ............ G01D 5/34707; G01D 5/34715; G01D 5/34746
See application file for complete search history.

(56) References Cited

U.S. PATENT DOCUMENTS

| | | |
|---|---|---|
| 4,979,827 A | 12/1990 | Matsui |
| 5,204,524 A | 4/1993 | Ichikawa et al. |
| 5,456,021 A * | 10/1995 | Nelle ............ H03M 1/287 250/237 G |
| 5,880,839 A | 3/1999 | Ishizuka et al. |

* cited by examiner

*Primary Examiner* — Tony Ko
(74) *Attorney, Agent, or Firm* — Rankin, Hill & Clark LLP

(57) ABSTRACT

An optical encoder according to the present invention includes a light source that emits light; a scale including scale gratings each having a predetermined pitch; a light source grating disposed between the light source and the scale and having a predetermined pitch; and an interference fringe detector that detects an interference fringe generated by the light source grating and the scale. The scale gratings are disposed side by side, and the adjacent scale gratings are displaced from each other by a ½ period.

20 Claims, 15 Drawing Sheets

OPTICAL ENCODER

CROSS REFERENCES TO RELATED APPLICATIONS

The present invention contains subject matter related to Japanese Patent Application No. 2013-266515 filed in the Japan Patent Office on Dec. 25, 2013, the entire contents of which are incorporated herein by reference.

BACKGROUND OF THE INVENTION

1. Field of the Invention

The present invention relates to an optical encoder.

2. Description of the Related Art

Japanese Unexamined Patent Application Publication No. 63-33604 describes an optical encoder that detects a relative displacement between two members by using a three-grating principle. FIG. 11 illustrates the structure of an optical encoder 800 described in Japanese Unexamined Patent Application Publication No. 63-33604. The optical encoder 800 includes three gratings, which are a light source grating 120 disposed directly below a light source 110, a scale grating 850 disposed in a scale 840, and a light-receiving grating 151 disposed directly above a photodiode 152. A detection head 170, which includes the light source grating 120 and the light-receiving grating 151, moves relative to the scale 840; and the amount of movement of the detection head 170 is detected from a change in the intensity of a signal generated by the photodiode 152.

The light source grating 120 includes light-transmitting portions 121 and light-blocking portions 122, which are alternately arranged with a period P. The scale grating 850 includes light-transmitting portions 851 and light-blocking portions 852, which are alternately arranged with a period P. The light-receiving grating 151 includes light-transmitting portions 153 and light-blocking portions 154, which are alternately arranged with a period P. According to the three-grating principle, the light source grating 120, the scale grating 850, and the light-receiving grating 151 have the same grating pitch. Moreover, a gap between the light source grating 120 and the scale 840 and a gap between the scale 840 and the light-receiving grating 151 are the same as each other.

FIG. 12 is a cross-sectional view illustrating the light source grating 120, the scale grating 850, and the light-receiving grating 151. Cross-sections of light-blocking portions 122a to 122d, 852a to 852e, and 154a to 154d are hatched.

How the scale 840 moves and how interference fringes are generated due to the movement of the optical encoder 800 will be briefly described. To be specific, how a peak of signal intensity occurs every time the scale 840 moves by a half pitch according to the three-grating principle will be described. The description will be made with reference to FIGS. 12, 13, and 14. FIG. 12 illustrates an initial state. In the state shown in FIG. 12, the lines of the light source grating 120 and the scale grating 850 are aligned with each other. (Thus, there are paths through which 0-th order light can pass light-transmitting portions of the light source grating 120 and the scale grating 850.) The light-receiving grating 151 is disposed so that the lines thereof are aligned with those of the light source grating 120. Therefore, in the state shown in FIG. 12, the lines of the light source grating 120, the scale grating 850, and the light-receiving grating 151 are aligned with each other. In this state, the light-transmitting portions of the light source grating 120 will be referred to as 121a, 121b, 121c, . . . , from the right side. Likewise, the light-transmitting portions of the scale grating 850 will be referred to as 851a, 851b, 851c, . . . , from the right side. The light-transmitting portions of the light-receiving grating 151 will be referred to as 153a, 153b, 153c, . . . , from the right side.

In this state, bright interference fringes are formed at positions where light rays that have passed through light-transmitting portions of the light source grating 120 and the scale grating 850 and reached the light-receiving grating 151 along the same optical path length. For example, the optical path lengths of a light ray that passes through 121b, 851c, and 153c and a light ray that passes through 121b, 851b, and 153c are the same. Accordingly, a bright interference fringe is formed at the light-transmitting portion 153c of the light-receiving grating 151. Likewise, the optical path lengths of a light ray that passes through 121b, 851c, and 153b and a light ray that passes through 121b, 851a, and 153b are the same. Accordingly, a bright interference fringe is formed at the light-transmitting portion 153b of the light-receiving grating 151. As describe above, in the state shown in FIG. 12, light that has passed through the light source grating 120 and the scale grating 850 generates interference fringes including bright interference fringes arranged with a half-pitch period at the position of the light-receiving grating 151. Accordingly, all light rays forming the bright interference fringes pass through the light-transmitting portions of the light-receiving grating 151 and reach the photodiode 152. At this time, the signal intensity of the photodiode 152 is at a peak.

Next, suppose that the scale grating 850 gradually moves rightward from the state shown in FIG. 12. When the scale grating 850 moves, the positions of the interference fringes gradually change. As the positions of bright interference fringes become displaced from the light-transmitting portions of the light-receiving grating 151, the signal intensity of the photodiode 152 would gradually decrease. The signal intensity reaches a peak again when the scale 840 has moved by a half pitch as illustrated in FIG. 13.

As can be seen by tracing light rays in FIG. 13, the optical path lengths of a light ray that passes through 121b, 851d, and 153c and a light ray that passes through 121b, 851b, and 153c are the same. Accordingly, a bright interference fringe is formed at the light-transmitting portion 153c of the light-receiving grating 151. (Recall that, also in the state shown in FIG. 12, a bright interference fringe is formed at the light-transmitting portion 153c of the light-receiving grating 151.) Likewise, for example, the optical path lengths of a light ray that passes through 121b, 851c, and 153b and a light ray that passes through 121b, 851b, and 153b are the same. Accordingly, a bright interference fringe is formed at the light-transmitting portion 153b of the light-receiving grating 151.

As described above, in the state shown in FIG. 13, light that has passed through the light source grating 120 and the scale grating 850 form interference fringes including bright interference fringes arranged at a half-pitch period at the position of the light-receiving grating 151. These interference fringes are the same as those formed in the state shown in FIG. 12 (before the scale grating 850 moves by a half pitch).

FIG. 14 illustrates a state in which the scale grating 850 has moved further by a half pitch, which is substantially the same as the state shown in FIG. 12. Accordingly, interference fringes formed in the state shown in FIG. 14 are the same as those of FIG. 12.

FIG. 15 is a graph representing a change in the detection signal that occurs when the scale grating 850 moves. The detection signal reaches a peak every time the scale grating 850 moves by a half pitch. Although it may not be possible to make the line spacing of each of the light source grating 120, the scale grating 850, and the light-receiving grating 151 smaller than the pitch P due to limitation on manufacturing technology, an encoder including these grating has a resolution of a half pitch (P/2). This a great advantage of an encoder using the three-grating principle.

Moreover, an encoder using the three-grating principle has the following advantage. Because the same change in the signal intensity is repeated with a certain period (every time the scale grating 850 moves by a half pitch), interpolation of dividing one period of the signal can be performed so as to detect a displacement of the scale grating 850 smaller than the signal period (half pitch). Note that this interpolation, in which a half period P/2 is interpolated, provides a resolution that is twice a resolution obtained by performing interpolation in which a period P is interpolated.

As described above, according to the three-grating principle, a peak of the detection signal can be obtained every time the scale grating 850 moves by a half pitch. To be more specific, the signal intensity at peaks XII and XIV slightly differs from that at a peak XIII. In FIG. 15, the peak XII corresponds to the state shown in FIG. 12, the peak XIII corresponds to the state shown in FIG. 13, and the peak XIV corresponds to the state shown in FIG. 14. Although the peak of the signal occurs every time the scale grating 850 moves by a half pitch, the signals obtained at every half pitch differ from each other. This means that it is not possible to correctly perform interpolation, which assumes that the same signal can be obtained at every certain period (every time the scale grating 850 moves by a half pitch).

It is certain that the peak XII (in the case shown in FIG. 12) is the same as the peak XIV (in the case shown in FIG. 14), which is formed when the scale grating 850 moves by one pitch from the state shown in FIG. 12. Accordingly, in order to perform interpolation correctly, it is necessary to interpolate the period P. If interpolation were performed with a period P/2, an interpolation error would be unavoidably generated. (The interpolation error would have a period P.) It is meaningless to perform interpolation of the period P/2, for obtaining a high resolution, only to generate an unavoidable error with the period P.

The inventors noticed this problem and investigated the cause of the problem. As a result, the inventors found that, even though positions of the interference fringes generated in the case of FIG. 12 (FIG. 14) are the same as those of the case of FIG. 13, the characteristics of the optical paths in these cases differ from each other.

SUMMARY OF THE INVENTION

The present invention provides an optical encoder that can obtain a detection signal precisely having a period P/2, where P is a grating pitch.

According to a first aspect of the present invention, an optical encoder includes a light source that emits light, a scale including two or more scale gratings each having a predetermined pitch, a light source grating disposed between the light source and the scale and having a predetermined pitch, and an interference fringe detector that detects an interference fringe generated by the light source grating and the scale. The two or more scale gratings are disposed side by side, and any adjacent pair of the scale gratings are displaced from each other by a ½ period.

Preferably, the two or more scale gratings have the same pitch.

Preferably, the interference fringe detector detects interference fringes generated by the scale gratings that are displaced from each other by a ½ period as one interference fringe.

Preferably, the scale is an elongated scale, and the scale gratings are arranged in two rows or in four rows in a transversal direction of the scale.

Preferably, the scale extends two-dimensionally, and the scale gratings are arranged in 2N rows, where N is an integer.

Preferably, a width, in a transversal direction, of the light source grating is greater than a width, in the transversal direction, of a region in which the two or more scale gratings are disposed.

According to a second aspect of the present invention, an optical encoder includes a light source that emits light, an XY-scale including a staggered grating that has an predetermined pitch and that extends two-dimensionally, an X-axis-direction light source grating disposed between the light source and the XY-scale and including a grating having a predetermined pitch in an X-axis direction, a Y-axis-direction light source grating disposed between the light source and the XY-scale and including a grating having a predetermined pitch in a Y-axis direction crossing the X-axis direction, an X-axis-direction interference fringe detector that detects an interference fringe generated by the X-axis-direction light source grating and the XY-scale, and a Y-axis-direction interference fringe detector that detects an interference fringe generated by the Y-axis-direction light source grating and the XY-scale.

With the present invention, it is possible to provide an optical encoder that can obtain a detection signal precisely having a period P/2, where P is a grating pitch.

DESCRIPTION OF THE PREFERRED EMBODIMENTS

First Embodiment

Figure 1:
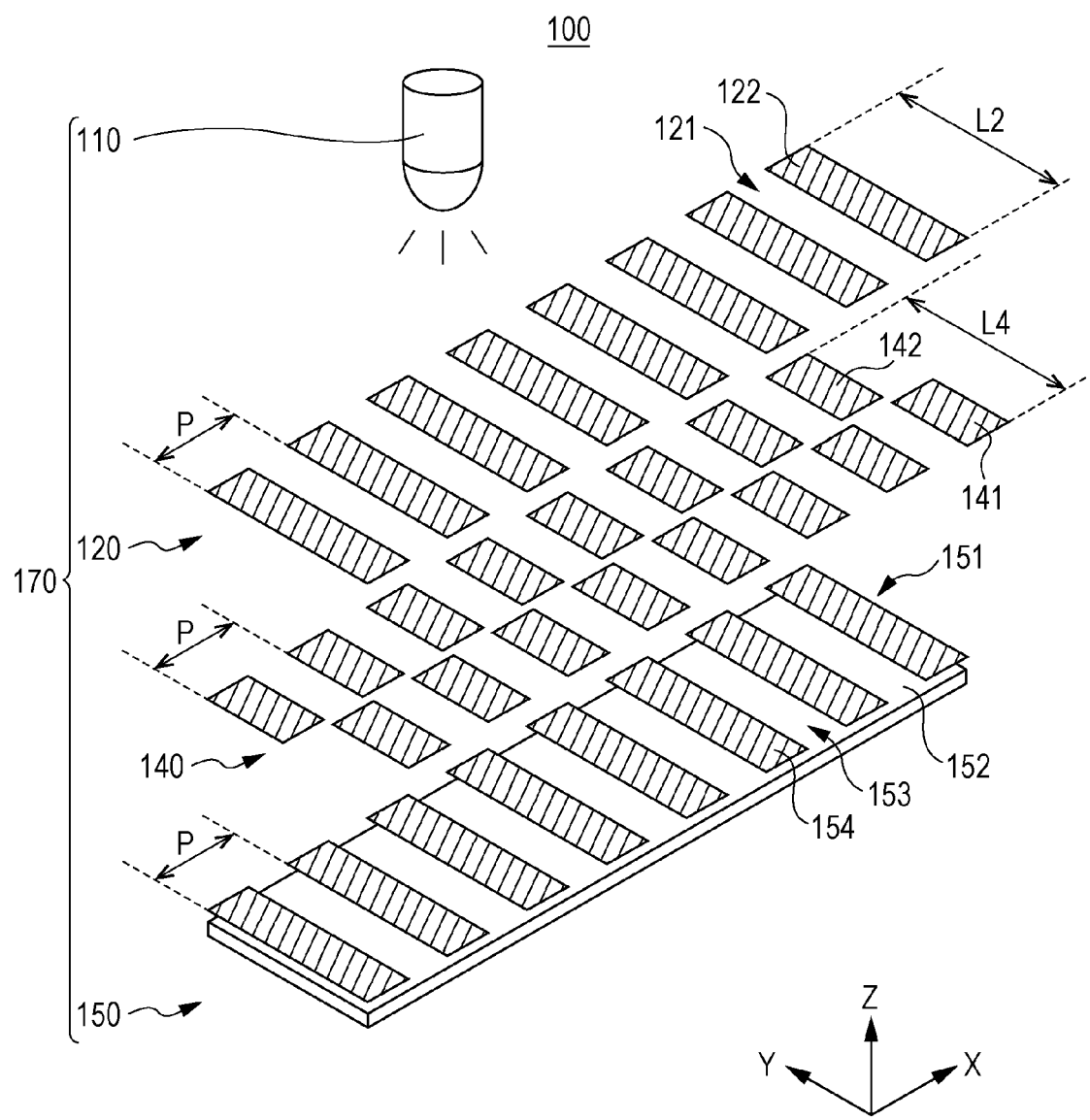
FIG. 1 is a perspective view illustrating the structure of an encoder according to a first embodiment.

Hereinafter, embodiments of the present invention will be described with reference to the drawings. FIG. 1 is a perspective view illustrating the structure of an optical encoder 100 according to a first embodiment. The optical encoder 100 includes a scale 140 and a detection head 170. The detection head 170 includes a light source 110, a light source grating 120, and an interference fringe detector 150. The interference fringe detector 150 includes a light-receiving grating 151 and a photodiode 152. The optical encoder 100, in which the detection head 170 moves relative to the scale 140, detects the amount of movement of the detection head 170 relative to the scale 140. A gap between the light source grating 120 and the scale 140 and a gap between the scale 140 and the interference fringe detector 150 are the same as each other.

Figure 2:
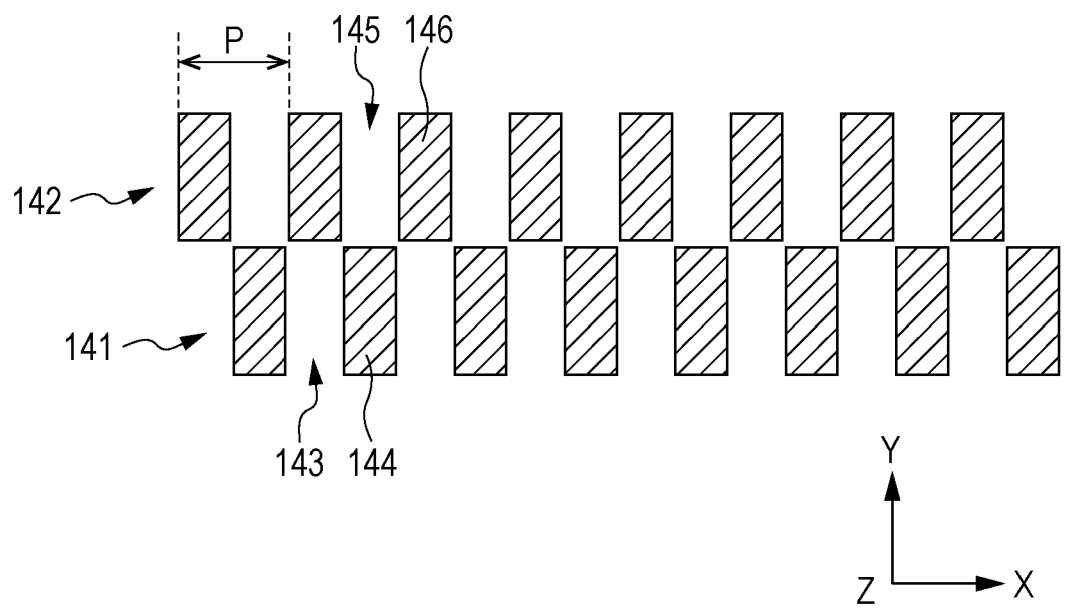
FIG. 2 is a plan view illustrating the structure of a scale of the encoder according to the first embodiment.

FIG. 2 illustrates the structure of the scale 140. The scale 140 includes a first scale grating 141 and a second scale grating 142, which are disposed on a glass substrate (not shown). The first scale grating 141 and the second scale grating 142 both extend in the X-axis direction (first direction). The first scale grating 141 and the second scale grating 142 are disposed side by side on the glass substrate.

The first scale grating 141 includes light-transmitting portions 143 and light-blocking portions 144. The light-transmitting portions 143 and the light-blocking portions 144 are alternately arranged with a period P. The second scale grating 142 includes light-transmitting portions 145 and light-blocking portions 146. The light-transmitting portions 145 and the light-blocking portions 146 are alternately arranged with a period P. An important point here is that the first scale grating 141 and the second scale grating 142 are disposed so as to be displaced from each other by a ½ period (P/2) in the X-axis direction. Note that, instead of the light-blocking portions 144 and 146, the first scale grating 141 and the second scale grating 142 may include light reflection portions that are made of a material having a high reflectivity. In this case, the scale 140 functions a reflective scale.

As illustrated in FIG. 1, the detection head 170 includes the light source 110, the light source grating 120, and the interference fringe detector 150. The light source 110 emits light. As the light source 110, for example, a light-emitting diode (LED), a laser diode, a self-scanning light emitting device (SLED), or an organic light-emitting diode (OLED) is used.

The light source grating 120 is disposed directly below the light source 110. The light source grating 120 includes light-transmitting portions 121 and light-blocking portions 122. The light-transmitting portions 121 and the light-blocking portions 122 are alternately arranged in the longitudinal direction (X-axis direction). The light source grating 120 is disposed on a glass substrate (not shown). The width L2, in the transversal direction (Y-axis direction), of the light source grating 120 is greater than the width L4, in the transversal direction, of a region in which the first scale grating 141 and the second scale grating 142 are disposed. Thus, the first scale grating 141 and the second scale grating 142 are uniformly irradiated with light that has passed through the light source grating 120.

The interference fringe detector 150 detects interference fringes generated by the light source grating 120 and the scale 140. The interference fringe detector 150 includes the light-receiving grating 151 and the photodiode 152. The photodiode 152 receives light and converts the received light into an electric signal (detection signal). The intensity of a detection signal changes in accordance with the intensity of the received light. The light-receiving grating 151 includes light-transmitting portions 153 and light-blocking portions 154. The light-transmitting portions 153 and the light-blocking portions 154 are alternately arranged with a period P. FIG. 1 illustrates a case where the scale 140 is a transmissive scale. In a case where the scale 140 is a reflective scale, the interference fringe detector 150 is disposed on the same side of the scale 140 as the light source 110.

The photodiode 152 detects light that passes through the light-transmitting portions 153 of the light-receiving grating 151 and that forms interference fringes, and the photodiode 152 converts the light into a detection signal. The interference fringe detector 150 may include, instead of the light-receiving grating 151 and the photodiode 152, a photodiode array in which a plurality of photodiodes are arranged. The interference fringe detector 150 illustrated in FIG. 1 is configured to output a single-phase sinusoidal signal. Alternatively, four light-receiving gratings 151 may be disposed so that the phases thereof are shifted from each other by $\pi/4$. In this case, the interference fringe detector 150 can output signals respectively having a phase A+, a phase B+, a phase A−, and a phase B−, which are shifted from each other by $\pi/4$.

Next, an operation of the optical encoder 100 will be described. Light emitted from the light source 110 is diffracted when the light passes through the light source grating 120 and becomes coherent light. Because the light source grating 120 has a large number of the light-transmitting portions 121, light that has passed through the light source grating 120 behaves like a large number of linear light sources that are arranged in the X-axis direction.

Light that has passed through the light source grating 120 is diffracted by the first scale grating 141 and the second scale grating 142 of the scale 140. The term "first positional relationship" will refer to a state in which the lines of the scale grating, the light source grating, and the light-receiving grating are aligned with each other, that is, a state in which there is a path along which 0-th order light that has passed through the light source grating can pass the scale grating. The term "second positional relationship" will refer to a state in which the lines of the light source grating, the light-receiving grating, and the scale grating are shifted from each other by a half pitch, that is, a state in which 0-th order light that has passed through the light source grating is blocked by the scale grating.

The term "first interference fringes" will refer to interference fringes that are generated when the scale grating is in the first positional relationship. The term "second interference fringes" will refer to interference fringes that are generated when the scale grating is in the second positional relationship. The first interference fringes and the second interference fringes have the same phase. The first interference fringes and the second interference fringes are formed by light rays that reach the light-transmitting portions 153 of the light-receiving grating 151 along different optical paths. Therefore, although the first interference fringes and the second interference fringes have the same phase, the intensities of the first interference fringes and the second interference fringes may differ from each other.

Figure 3:
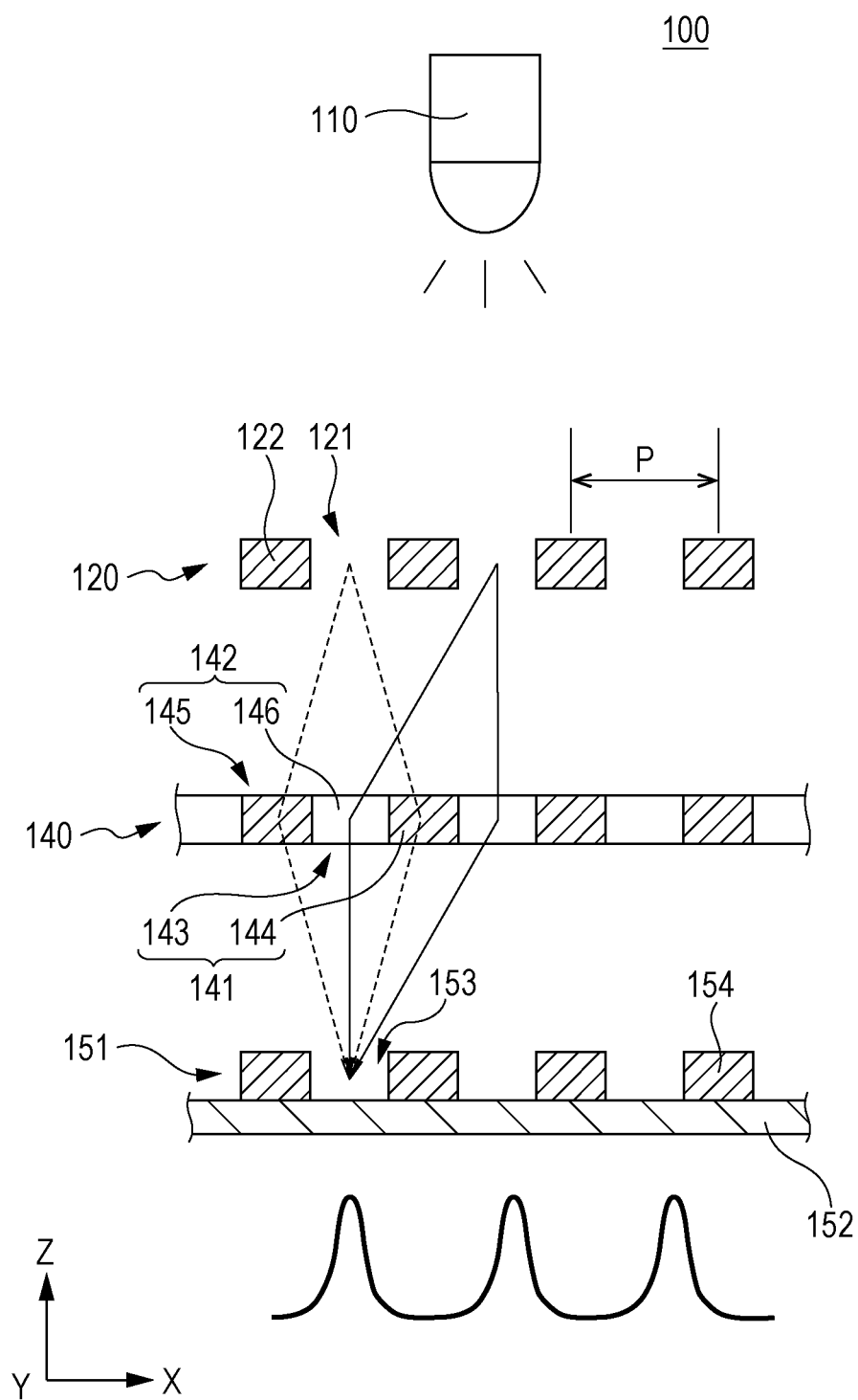
FIG. 3 illustrates the optical paths of light rays that are incident on a light-receiving grating when a first scale grating is in a first positional relationship and a second scale grating is in a second positional relationship in the encoder according to the first embodiment.

In FIG. 3, the first scale grating 141 is in the first positional relationship. At this time, the second scale grating 142, whose is displaced from the first scale grating 141 by a half pitch, is in the second positional relationship. In FIG. 3, light that passes through the first scale grating 141 is represented by solid lines, and light that passes through the second scale grating 142 is represented by broken lines.

In the state shown in FIG. 3, the first scale grating 141, which is in the first positional relationship, forms the first interference fringes; and the second scale grating 142, which is in the second positional relationship, forms the second interference fringes. Light that forms the first interference fringes and light that forms the second interference fringes are added in the ratio of 50:50, pass through the light-transmitting portions 153 of the light-receiving grating 151, and enter the photodiode 152.

Figure 4:
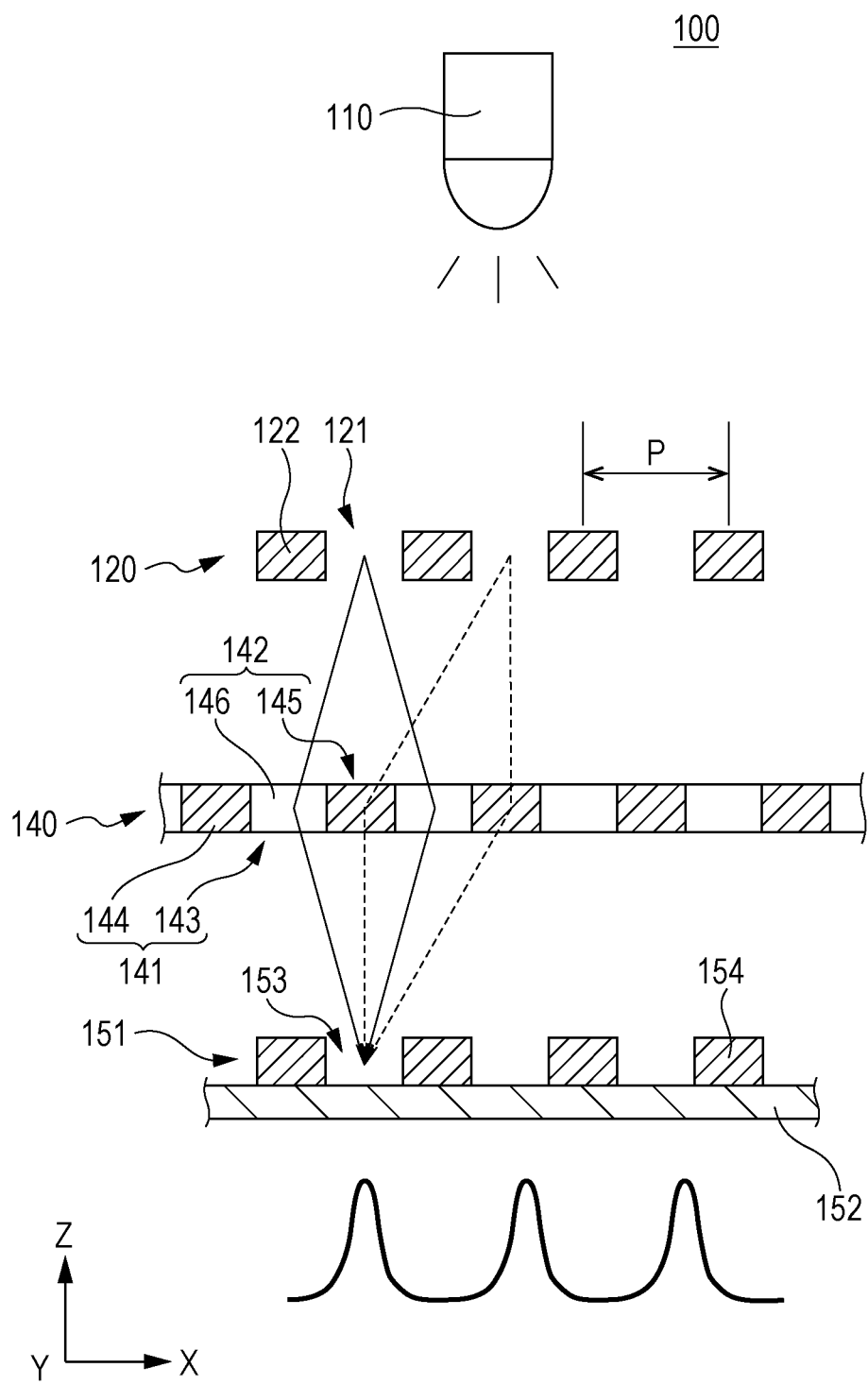
FIG. 4 illustrates the optical paths of light rays that are incident on the light-receiving grating when the first scale grating is in the second positional relationship and the second scale grating is in the first positional relationship in the encoder according to the first embodiment.

FIG. 4 illustrates a state in which the scale 140 has been displaced by a half pitch from the state shown in FIG. 3. In FIG. 4, as in FIG. 3, light that passes through the first scale grating 141 is represented by solid lines, and light that passes through the second scale grating 142 is represented by broken lines. In FIG. 4, the first scale grating 141 is in the second positional relationship. At this time, the second scale grating 142, whose is displaced from the first scale grating 141 by a half pitch, is in the first positional relationship. The first scale grating 141, which is in the second positional relationship, forms the second interference fringes; and the second scale grating 142, which is in the first positional relationship, forms the first interference fringes. The first interference fringes and the second interference fringes have the same phase. With respect to the sum of signal intensities, the state of the optical encoder 100 shown in FIG. 4 is the same as that of FIG. 3.

The optical encoder 800 described in Japanese Unexamined Patent Application Publication No. 63-33604 has only one scale grating. Therefore, every time the scale grating moves by a half pitch, the first positional relationship and the second positional relationship alternately occur. Thus, the first interference fringes and the second interference fringes are alternately generated. As a result, the intensities of peaks of a detection signal generated by the photodiode 152 fluctuate.

In contrast, the optical encoder 100 according to the present embodiment includes the second scale grating 142 in addition to the first scale grating 141. Due to this structure, the first positional relationship and the second positional relationship exist simultaneously when the scale 140 moves. Accordingly, the first interference fringes and the second interference fringes exist simultaneously. Therefore, the first interference fringes and the second interference fringes are always added together at the photodiode 152, and the intensities of peaks of a detection signal generated by the photodiode 152 do not fluctuate.

As heretofore described, with the present invention, it is possible to provide an optical encoder that can obtain a detection signal precisely having a period P/2, where P is the grating pitch.

Second Embodiment

Figure 5:
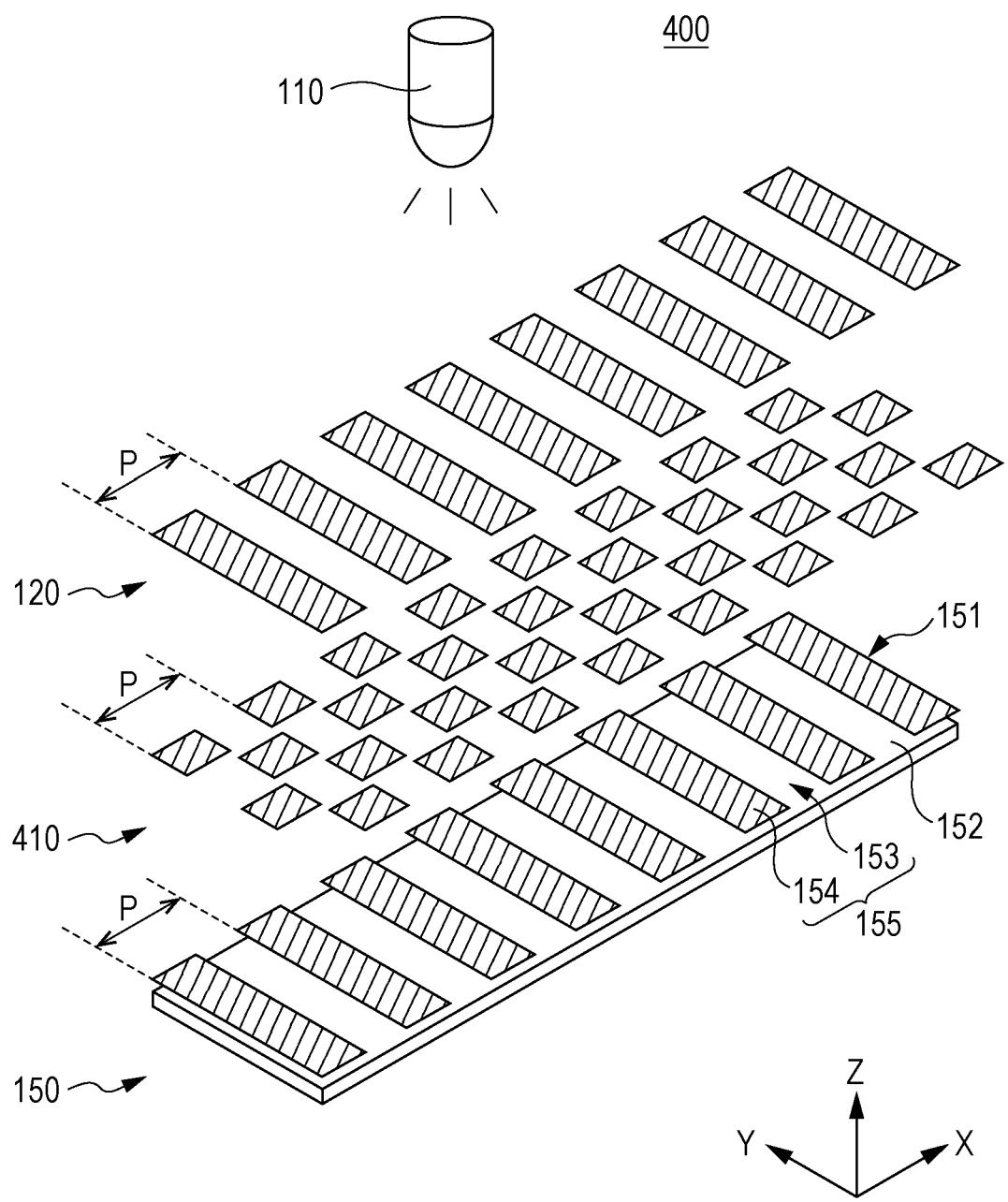
FIG. 5 is a perspective view illustrating the structure of an encoder according to a second embodiment.

FIG. 5 illustrates the structure of an optical encoder 400 according to a second embodiment. The optical encoder 400 includes a light source 110, a light source grating 120, a scale 410, and an interference fringe detector 150. The optical encoder 400 detects the amount of movement of the scale 410 relative to the light source 110, the light source grating 120, and the interference fringe detector 150. A gap between the light source grating 120 and the scale 410 and a gap between the scale 410 and the interference fringe detector 150 are the same as each other.

Figure 6:
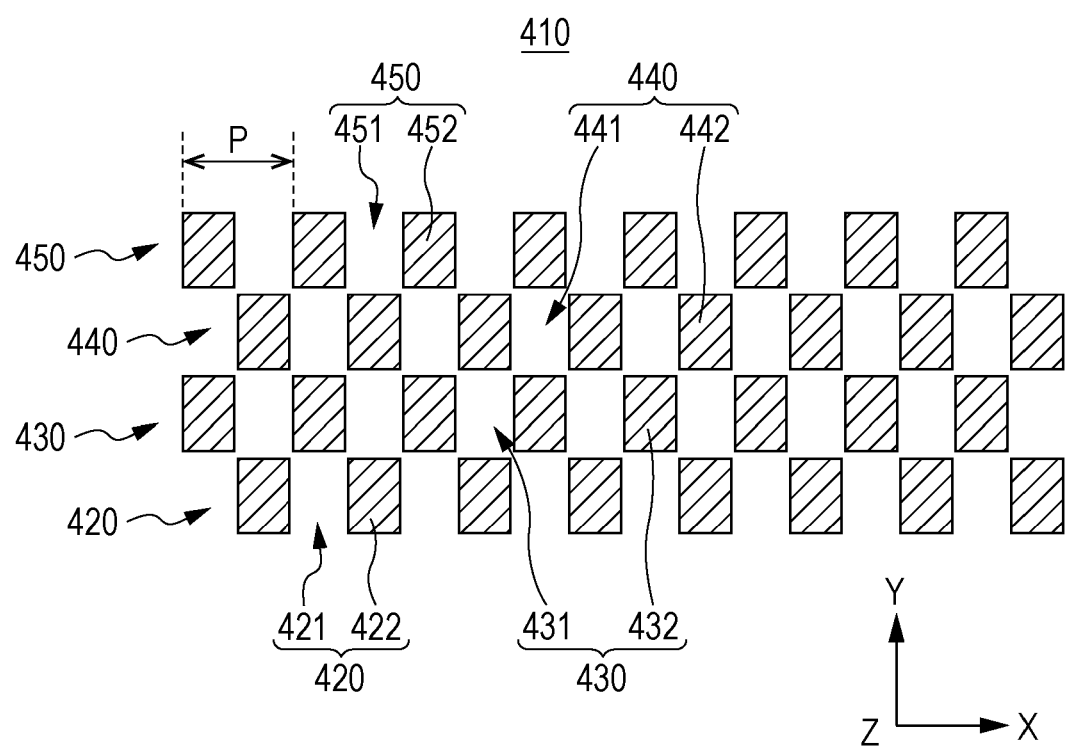
FIG. 6 is a plan view illustrating the structure of a scale of the encoder according to the second embodiment.

FIG. 6 is a plan view illustrating the structure of the scale 410. In the optical encoder 400, the scale 410 includes a first scale grating 420, a second scale grating 430, a third scale grating 440, and a fourth scale grating 450, which are disposed side by side on a glass substrate (not shown). The scale 410 has an elongated shape, and the scale gratings are arranged in four rows in the transversal direction of the scale 410.

Because the scale gratings 420 to 450 are arranged in this way, even if the light source grating 120 and the scale 410 are displaced from each other in the Y-axis direction, it is possible to reduce a change in the ratio of intensity of light incident on the first scale grating 420 and the third scale grating 440 to the intensity of light incident on the second scale grating 430 and the fourth scale grating 450. Thus, it is possible to reduce a change in the ratio of the intensity of light that forms the first interference fringes and enters the photodiode 152 to the intensity of light that forms the second interference fringes and enters the photodiode 152. Accordingly, if the light source grating 120 and the scale 410 are displaced from each other in the Y-axis direction, it is possible to reduce an interpolation error of a detection signal that is output from the photodiode 152.

Third Embodiment

Figure 7:
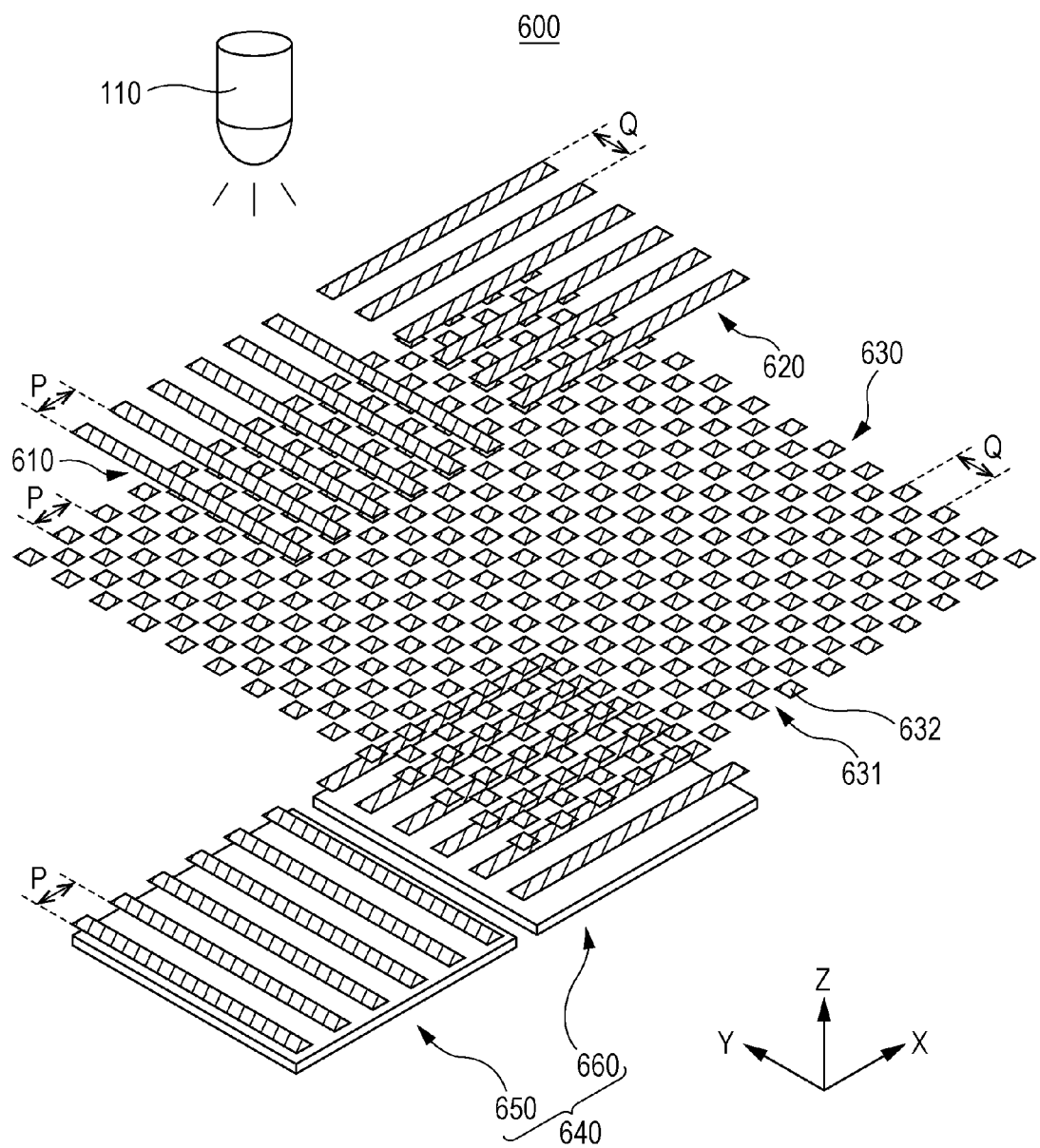
FIG. 7 is a perspective view illustrating the structure of an encoder according to a third embodiment.

FIG. 7 is a perspective view illustrating the structure of an optical encoder 600 according to a third embodiment. The optical encoder 600 can detect a displacement in the X-axis direction and a displacement in the Y-axis direction. The optical encoder 600 includes a structure for detecting a displacement in the X-axis direction, which is the same as the structure of the first embodiment. The optical encoder 600 includes a structure for detecting a displacement in the Y-axis direction, which is rotated by 90° from the structure of the optical encoder 100 according to the first embodiment. The optical encoder 600 includes a light source 110, an X-axis-direction light source grating 610, a Y-axis-direction light source grating 620, an XY-scale 630, and an interference fringe detector 640. The X-axis-direction light source grating 610 and the Y-axis-direction light source grating 620 are disposed on the same plane. A gap between the X-axis-direction light source grating 610 and the XY-scale 630, a gap between the Y-axis-direction light source grating 620 and the XY-scale 630, and a gap between the XY-scale 630 and the interference fringe detector 640 are the same as each other.

Figure 8:
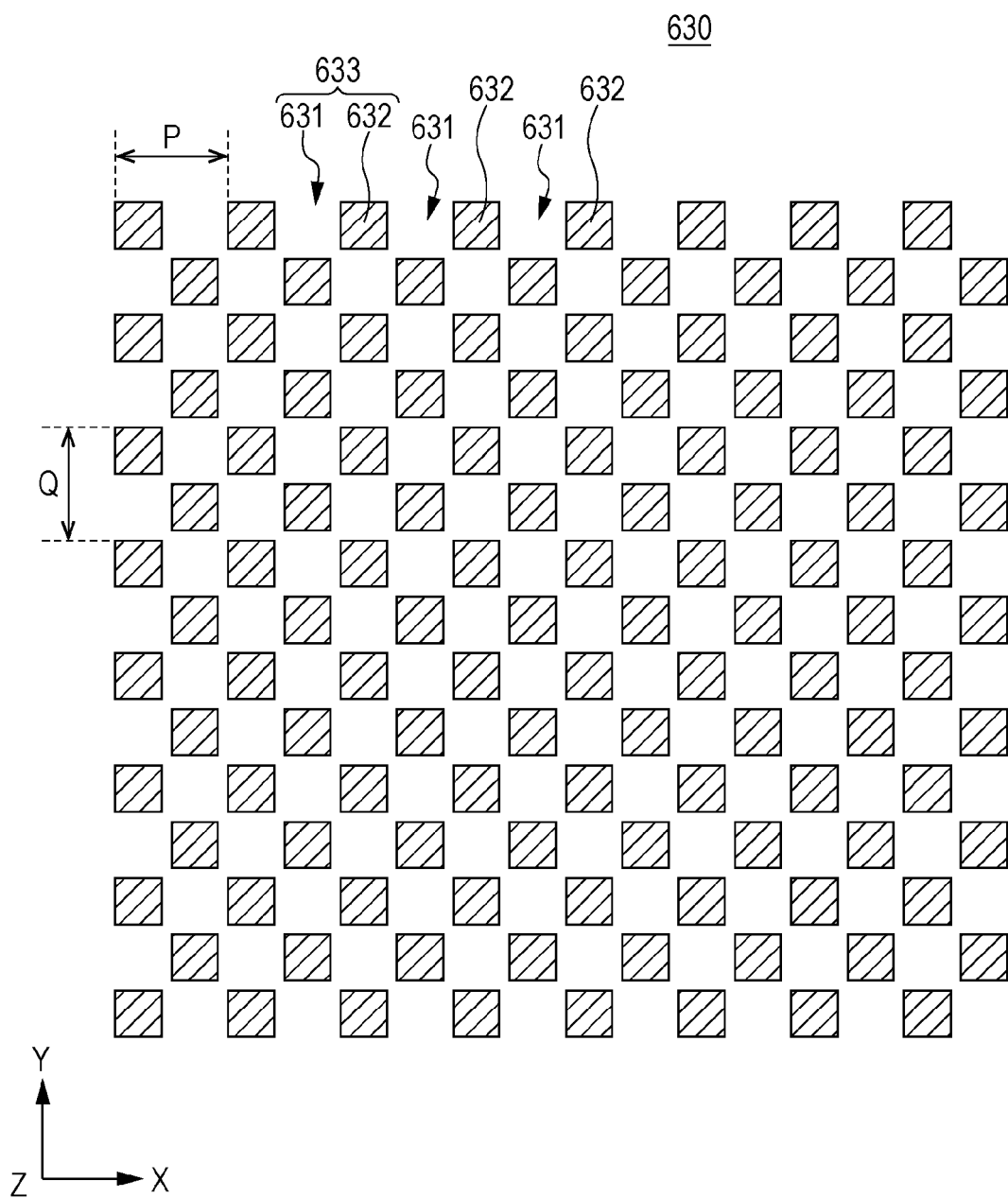
FIG. 8 is a plan view illustrating the structure of a scale of the encoder according to the third embodiment.

The XY-scale 630 includes an XY-grating 633, which is formed on a glass substrate (not shown). FIG. 8 is a plan view illustrating the structure of the XY-grating 633 of the XY-scale 630. The XY-grating 633 includes light-blocking portions 632 that are arranged two-dimensionally in a staggered manner. Light-transmitting portions 631, which allow light to pass therethrough, are portions of the XY-grating 633 at which the light-blocking portions 632 are not present. The XY-grating 633 has a period P in the X-axis direction and a period Q in the Y-axis direction. In other words, the XY-grating 633 includes scale gratings each including the light-transmitting portions 631 and the light-blocking portions 632, which are alternately arranged in the X-axis direction. The scale gratings are disposed side by side in the Y-axis direction so as to be displaced from each other by a ½ period.

By forming the light-blocking portions 632 from a material having a high reflectivity, the light-blocking portions 632 can be used as light reflection portions. In this case, the optical encoder 600 including the XY-grating 633, in which the light-transmitting portions 631 and the light reflection portions are arranged, serves as a reflective encoder. Because each light-transmitting portion 631 and each light reflection portion have the same shape, one XY-grating 633 can be used for a transmissive encoder and a reflective encoder. When the XY-grating 633 is used for a reflective encoder, because the ratio of the area of the light-transmitting portions 631 to the area of the light reflection portions (light-blocking portions 632) is 1:1, the XY-grating 633 can reflect a large amount of light, and the reflective encoder can generate a signal having a high intensity.

Figure 9:
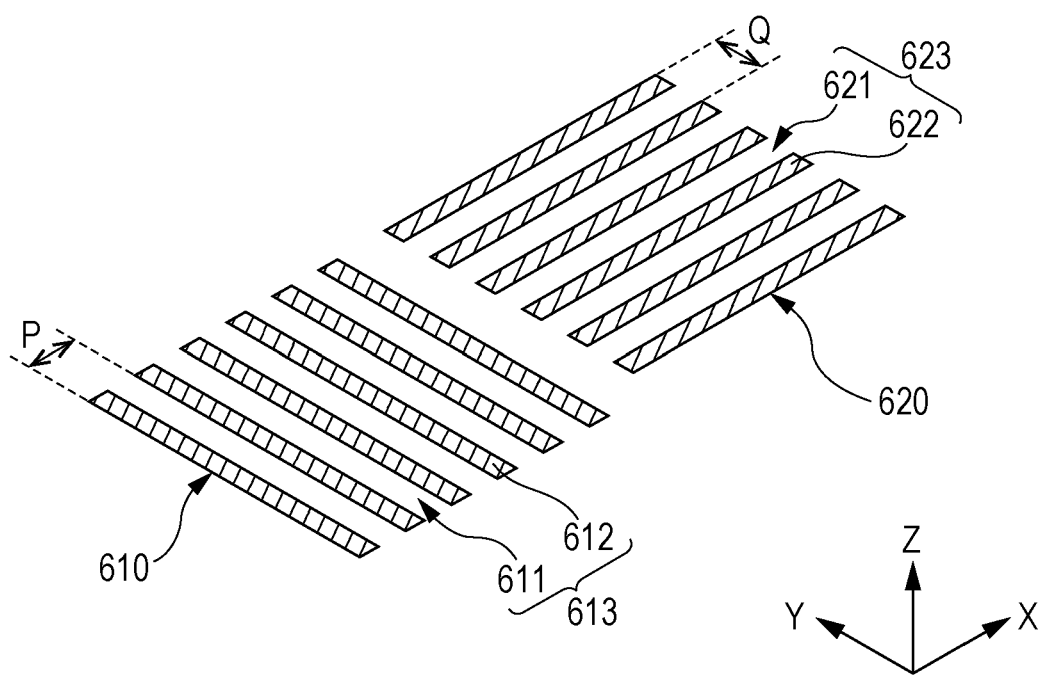
FIG. 9 is a perspective view illustrating the structures of an X-axis-direction light source grating and a Y-axis-direction light source grating of the encoder according to the third embodiment.
Figure 10:
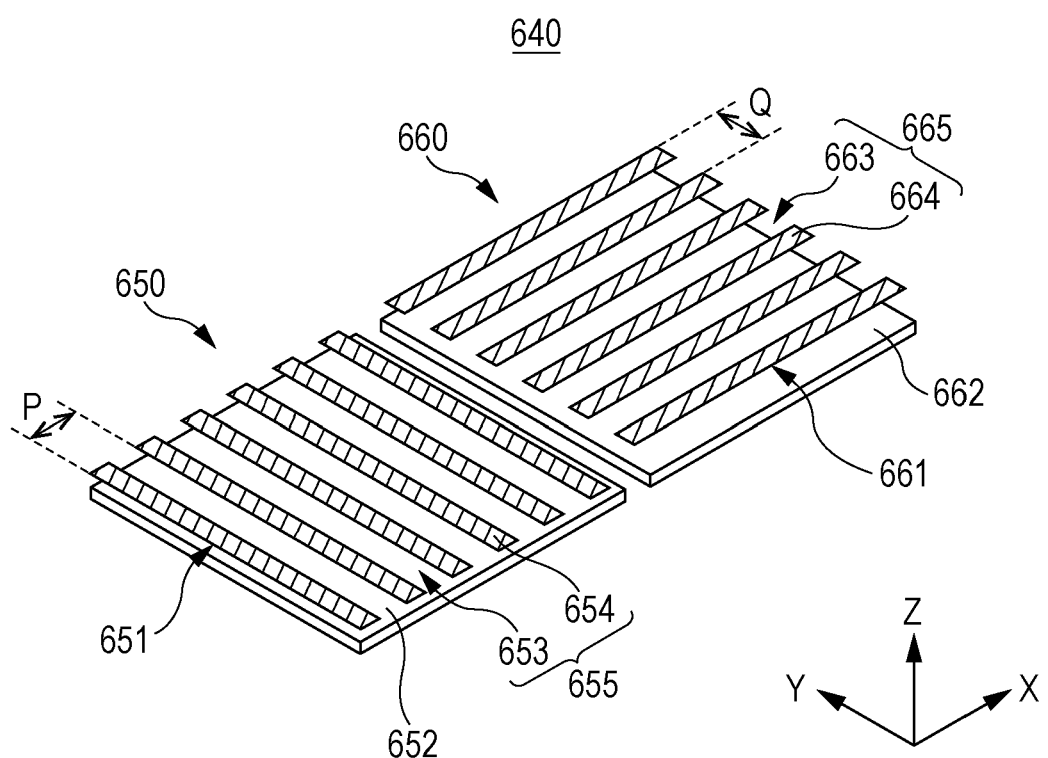
FIG. 10 is a perspective view illustrating the structures of an X-axis-direction light-receiving grating and a Y-axis-direction light-receiving grating of the encoder according to the third embodiment.
Figure 11:
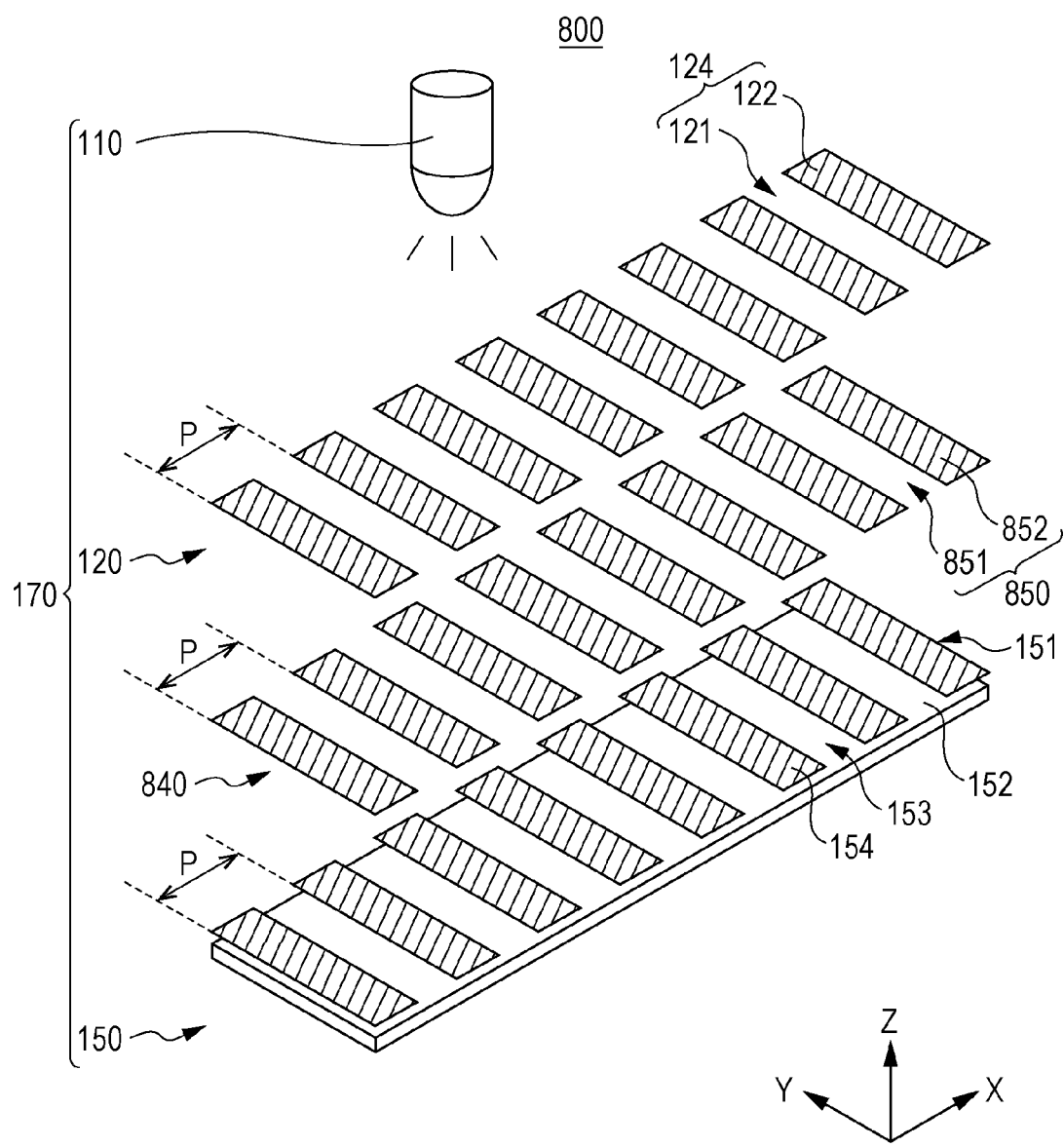
FIG. 11 is a perspective view illustrating the structure of an existing encoder.
Figure 12:
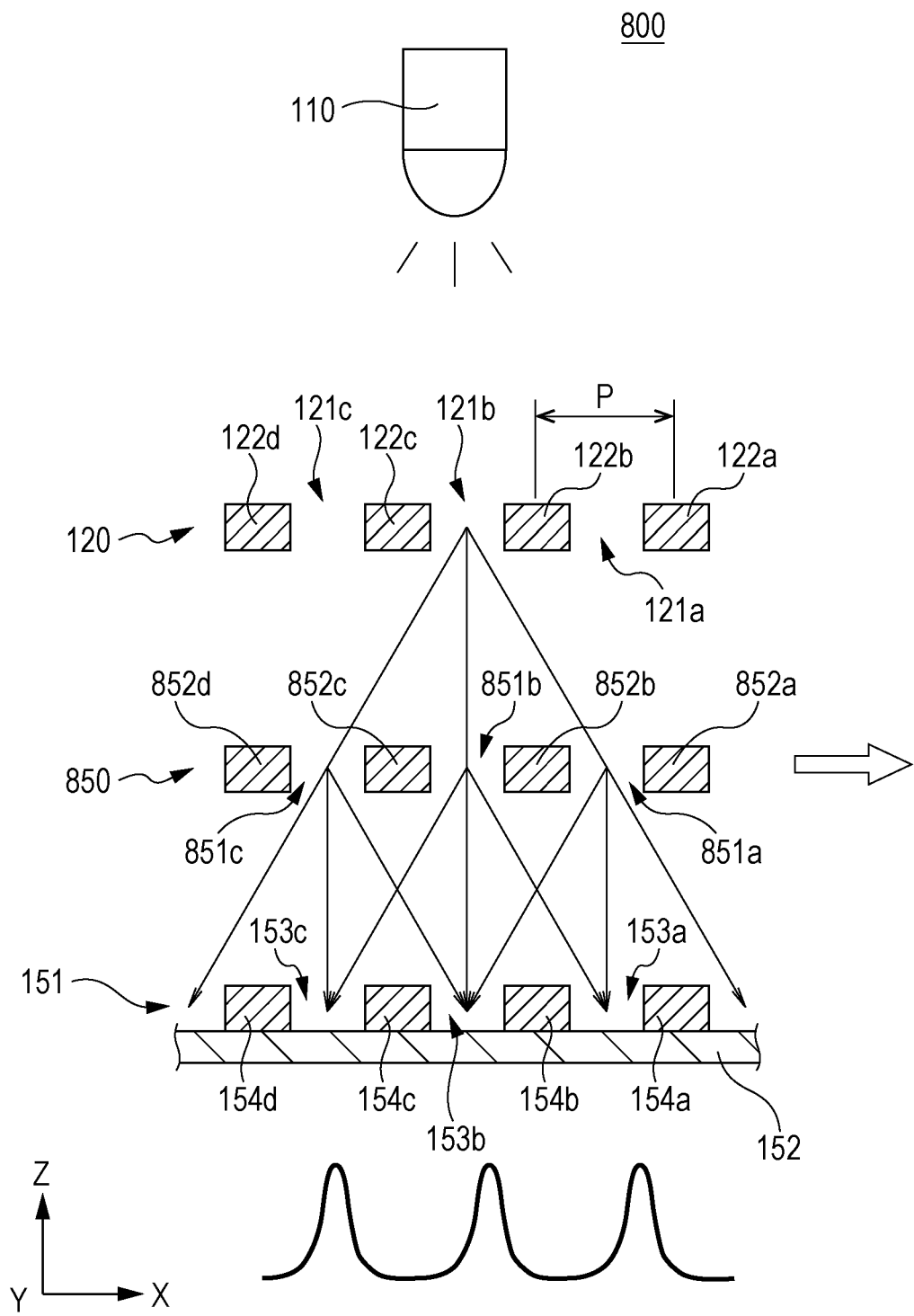
FIG. 12 is a first view illustrating an operation of the existing encoder.
Figure 13:
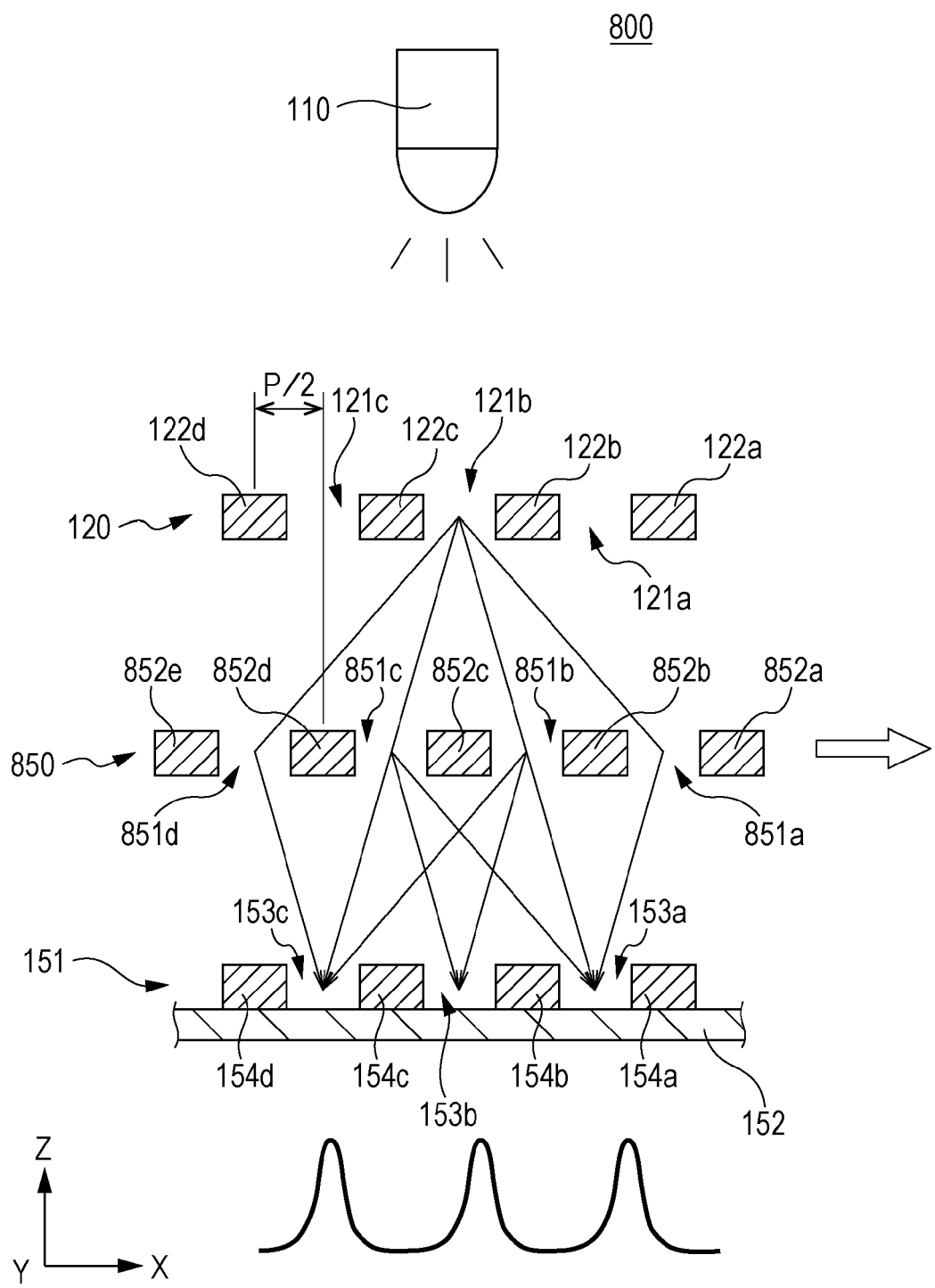
FIG. 13 is a second view illustrating an operation of the existing encoder.
Figure 14:
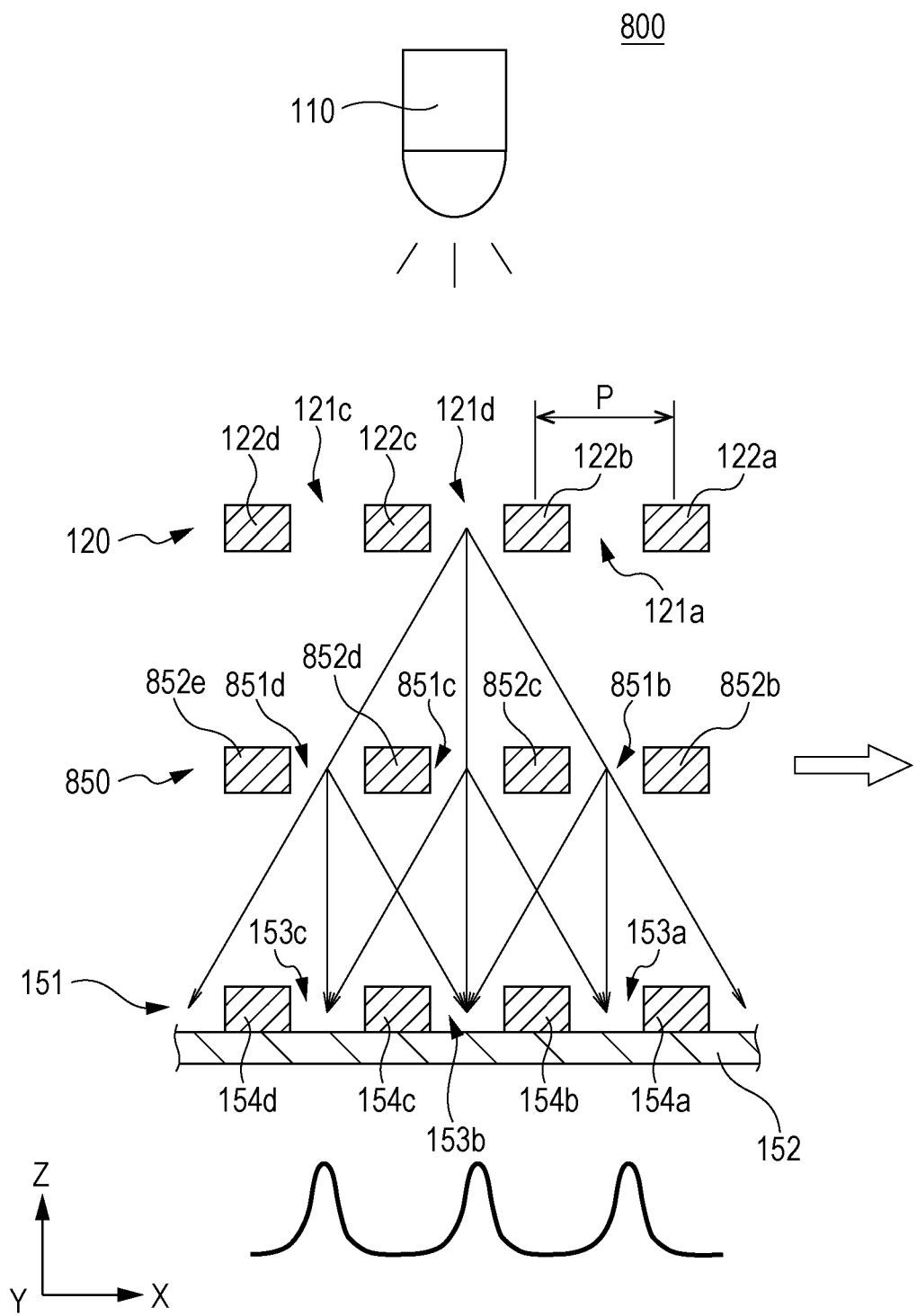
FIG. 14 is a third view illustrating an operation of the existing encoder.
Figure 15:
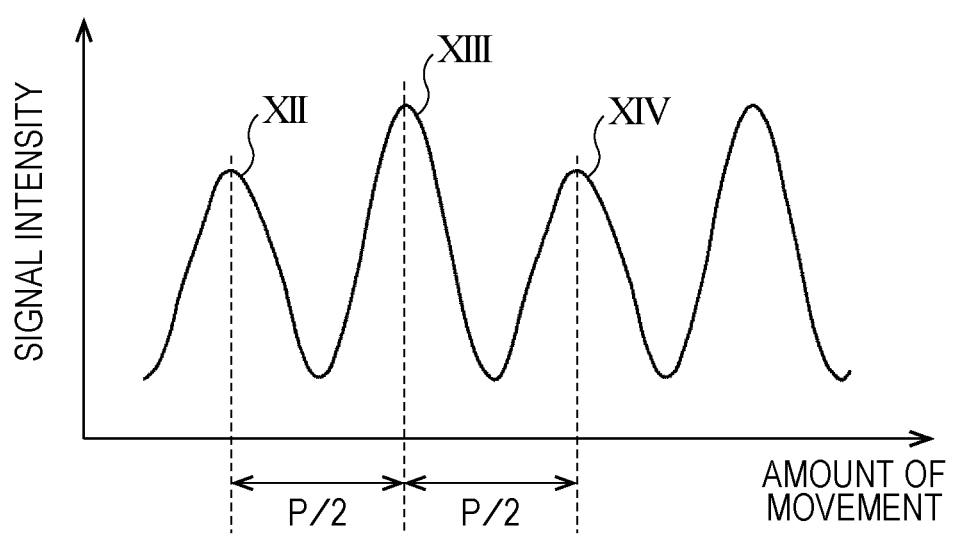
FIG. 15 is a graph representing a detection signal generated by the existing encoder.

FIG. 9 is a perspective view illustrating the structures of the X-axis-direction light source grating 610 and the Y-axis-direction light source grating 620. The X-axis-direction light source grating 610 includes light-transmitting portions 611 and light-blocking portions 612, which are arranged in the X-axis direction with a period P. The Y-axis-direction light source grating 620 includes light-transmitting portions 621 and light-blocking portions 622, which are arranged in the Y-axis direction with a period Q.

The interference fringe detector 640 includes an X-axis-direction interference fringe detector 650 that detects interference fringes in the X-axis direction (first direction) and a Y-axis-direction interference fringe detector 660 that detects interference fringes in the Y-axis direction (second direction). The X-axis-direction interference fringe detector 650 detects the amount of movement in the X-axis direction, and the Y-axis-direction interference fringe detector 660 detects the amount of movement in the Y-axis direction.

The X-axis-direction interference fringe detector 650 detects interference fringes generated by the X-axis-direction light source grating 610 and the XY-scale 630. The X-axis-direction interference fringe detector 650 includes an X-axis-direction light-receiving grating 651 and a first photodiode 652. The X-axis-direction light-receiving grating 651 includes light-transmitting portions 653 and light-blocking portions 654, which are arranged in the X-axis direction with a period P.

The Y-axis-direction interference fringe detector 660 detects an interference fringe generated by the Y-axis-direction light source grating 620 and the XY-scale 630. The Y-axis-direction interference fringe detector 660 includes a Y-axis-direction light-receiving grating 661 and a second photodiode 662. The Y-axis-direction light-receiving grating 661 includes light-transmitting portions 663 and light-blocking portions 664, which are arranged in the Y-axis direction with a period Q.

In each of the X-axis-direction light source grating 610, the Y-axis-direction light source grating 620, the XY-scale 630, the X-axis-direction light-receiving grating 651, and the Y-axis-direction light-receiving grating 661, the grating pitch in the X-axis direction may be the same as the grating pitch in the Y-axis direction (P=Q). When P=Q, each of the light-transmitting portions 631 and the light-blocking portions 632 of the XY-grating 633 has a square shape. Thus, the optical encoder 600 has the same resolution in the X-axis direction and in the Y-axis direction.

As described above, as with the first embodiment, the optical encoder 600 according to the third embodiment can obtain a detection signal precisely having a period P/2, where p is the grating pitch. Moreover, the optical encoder 600 according to the third embodiment can simultaneously detect a displacement in the X-axis direction and a displacement in the Y-axis direction.

The present invention is not limited to the embodiments described above, and the embodiments can be modified within the spirit and scope of the present invention. For example, in the embodiments described above, the encoders are transmissive encoders. However, the present invention can be applied to a reflective encoder. In the embodiments described above, the encoders are linear encoders. However, the present invention can be applied to a rotary encoder.

What is claimed is:

1. An optical encoder comprising:
   a light source that emits light;
   a scale including two or more scale gratings each having a predetermined pitch;
   a light source grating disposed between the light source and the scale and having a predetermined pitch; and
   an interference fringe detector that detects an interference fringe generated by the light source grating and the scale,
   wherein the two or more scale gratings are disposed side by side, and any adjacent pair of the scale gratings are displaced from each other by a ½ period;
   the interference fringe detector comprises a light-receiving grating that includes light-transmitting portions and light-blocking portions alternately arranged with the same pitch as the predetermined pitch of the light source grating; and
   a gap between the light source grating and the scale is the same as a gap between the scale and the light-receiving grating.

2. The optical encoder according to claim 1,
   wherein the two or more scale gratings have the same pitch.

3. The optical encoder according to claim 1,
   wherein the interference fringe detector detects interference fringes generated by the scale gratings that are displaced from each other by a ½ period as one interference fringe.

4. The optical encoder according to claim 2,
   wherein the interference fringe detector detects interference fringes generated by the scale gratings that are displaced from each other by a ½ period as one interference fringe.

5. The optical encoder according to claim 1,
   wherein the scale is an elongated scale, and
   wherein the scale gratings are arranged in two rows or in four rows in a transversal direction of the scale.

6. The optical encoder according to claim 2,
   wherein the scale is an elongated scale, and
   wherein the scale gratings are arranged in two rows or in four rows in a transversal direction of the scale.

7. The optical encoder according to claim 3,
   wherein the scale is an elongated scale, and
   wherein the scale gratings are arranged in two rows or in four rows in a transversal direction of the scale.

8. The optical encoder according to claim 4,
   wherein the scale is an elongated scale, and
   wherein the scale gratings are arranged in two rows or in four rows in a transversal direction of the scale.

9. The optical encoder according to claim 1,
wherein the scale extends two-dimensionally, and
wherein the scale gratings are arranged in 2N rows, where N is an integer.

10. The optical encoder according to claim 2,
wherein the scale extends two-dimensionally, and
wherein the scale gratings are arranged in 2N rows, where N is an integer.

11. The optical encoder according to claim 3,
wherein the scale extends two-dimensionally, and
wherein the scale gratings are arranged in 2N rows, where N is an integer.

12. The optical encoder according to claim 4,
wherein the scale extends two-dimensionally, and
wherein the scale gratings are arranged in 2N rows, where N is an integer.

13. The optical encoder according to claim 5,
wherein the scale extends two-dimensionally, and
wherein the scale gratings are arranged in 2N rows, where N is an integer.

14. The optical encoder according to claim 6,
wherein the scale extends two-dimensionally, and
wherein the scale gratings are arranged in 2N rows, where N is an integer.

15. The optical encoder according to claim 7,
wherein the scale extends two-dimensionally, and
wherein the scale gratings are arranged in 2N rows, where N is an integer.

16. The optical encoder according to claim 8,
wherein the scale extends two-dimensionally, and
wherein the scale gratings are arranged in 2N rows, where N is an integer.

17. The optical encoder according to claim 1,
wherein a width, in a transversal direction, of the light source grating is greater than a width, in the transversal direction, of a region in which the two or more scale gratings are disposed.

18. An optical encoder comprising:
a light source that emits light;
an XY-scale including a staggered grating that has an predetermined pitch and that extends two-dimensionally;
an X-axis-direction light source grating disposed between the light source and the XY-scale and including a grating having a predetermined pitch in an X-axis direction;
a Y-axis-direction light source grating disposed between the light source and the XY-scale and including a grating having a predetermined pitch in a Y-axis direction crossing the X-axis direction;
an interference fringe detector comprising an X-axis-direction interference fringe detector and a Y-axis-direction interference fringe detector,
wherein the X-axis-direction interference fringe detector detects an interference fringe generated by the X-axis-direction light source grating and the XY-scale, the X-axis-direction interference fringe detector comprising an X-axis-direction light-receiving grating that includes X-axis-direction light-transmitting portions and X-axis-direction light-blocking portions alternately arranged with the same pitch as the predetermined pitch of the X-axis-direction light source grating;
the Y-axis-direction interference fringe detector detects an interference fringe generated by the Y-axis-direction light source grating and the XY-scale, the Y-axis-direction interference fringe detector comprising a Y-axis-direction light-receiving grating that includes Y-axis-direction light-transmitting portions and Y-axis-direction light-blocking portions alternately arranged with the same pitch as the predetermined pitch of the Y-axis-direction light source grating; and
a gap between the X-axis-direction light source grating and the XY-scale, a gap between the Y-axis-direction light source grating and the XY-scale, and a gap between the XY-scale and the interference fringe detector are the same to each other.

19. The optical encoder according to claim 18,
wherein the X-axis-direction is perpendicular to the Y-axis-direction.

20. The optical encoder according to claim 19,
wherein the staggered grating includes light-blocking portions that are arranged two-dimensionally so that any adjacent pair of the light-blocking portions in the X-axis direction are displaced from each other by a ½ period and the light-blocking portions in the Y-axis direction are displaced from each other by a ½ period.

* * * * *